US007308538B2

(12) United States Patent
Shen

(10) Patent No.: US 7,308,538 B2
(45) Date of Patent: Dec. 11, 2007

(54) SCOPE-BASED CACHE COHERENCE

(75) Inventor: Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/981,370

(22) Filed: Nov. 4, 2004

(65) Prior Publication Data

US 2006/0095684 A1    May 4, 2006

(51) Int. Cl.
*G06F 12/08* (2006.01)
*G06F 12/10* (2006.01)

(52) U.S. Cl. .......................................... 711/141; 711/1
(58) Field of Classification Search ..................... None
See application file for complete search history.

(56) References Cited

U.S. PATENT DOCUMENTS 7,143,244 B2 * 11/2006 Ling et al. ................... 711/141
2003/0115402 A1 * 6/2003 Dahlgren et al. ............... 711/1

* cited by examiner

*Primary Examiner*—Hyung Sough
*Assistant Examiner*—Duc T. Doan
(74) *Attorney, Agent, or Firm*—F. Chau & Associates, LLC

(57) ABSTRACT

With scope-based cache coherence, a cache can maintain scope information for a memory address. The scope information specifies caches in which data of the address is potentially cached, but not necessarily caches in which data of the address is actually cached. Appropriate scope information can be used as snoop filters to reduce unnecessary coherence messages and snoop operations in SMP systems. If a cache maintains scope information of an address, it can potentially avoid sending cache requests to caches outside the scope in case of a cache miss on the address. Scope information can be adjusted dynamically via a scope calibration operation to reflect changing data access patterns. A calibration prediction mechanism can be employed to predict when a scope calibration needs to be invoked.

47 Claims, 5 Drawing Sheets

SCOPE-BASED CACHE COHERENCE

GOVERNMENT RIGHTS STATEMENT

This invention was made under Government support under Contract No.: NBCH30390004 awarded by DARPA. The Government has certain rights to this invention.

BACKGROUND OF THE INVENTION

1. Field of the Invention

The present invention relates to a computer-based memory system, and, more particularly, to cache coherence operations.

2. Description of the Related Art

A symmetric multiprocessor ("SMP") system generally employs a snoopy mechanism to ensure cache coherence. When a cache miss occurs, the requesting cache may send a cache request to the memory and all its peer caches. When a peer cache receives the cache request, the peer cache snoops its cache directory and produces a cache snoop response indicating whether the requested data is found and the state of the corresponding cache line. If the requested data is found in a peer cache, the peer cache can source the data to the requesting cache via a cache intervention (i.e., cache-to-cache transfer). The memory is responsible for supplying the requested data if the data cannot be supplied by any peer cache.

Referring now to FIG. 1, an exemplary SMP system is shown that includes multiple processing units interconnected via an interconnect network. Each processing unit includes a processor core and a cache. Also connected to the interconnect network are a memory and some I/O devices. The memory can be physically distributed into multiple memory portions, such that each memory portion is operatively associated with a processing unit. The interconnect network serves at least two purposes: (1) sending cache coherence requests to the caches and the memory; and (2) transferring data among the caches and the memory. Although four processing units are depicted, it is understood that any number of processing units can be included in the system. Furthermore, although only one cache is shown in each processing unit, it is understood that each processing unit may comprise a cache hierarchy with multiple caches, as contemplated by those skilled in the art.

There are many techniques for achieving cache coherence that are known to those skilled in the art. A number of snoopy cache coherence protocols have been proposed. The MESI coherence protocol and its variations have been widely used in SMP systems. As the name suggests, MESI has four cache states: modified (M), exclusive (E), shared (S) and invalid (I). If a cache line is in an invalid state, the data in the cache is not valid. If a cache line is in a shared state, the data in the cache is valid and can also be valid in other caches. The shared state is entered when the data is retrieved from memory or another cache, and the corresponding snoop responses indicate that the data is valid in at least one of the other caches. If a cache line is in an exclusive state, the data in the cache is valid, and cannot be valid in another cache. Furthermore, the data in the cache has not been modified with respect to the data maintained at memory. The exclusive state is entered when the data is retrieved from memory or another cache, and the corresponding snoop responses indicate that the data is not valid in another cache. If a cache line is in a modified state, the data in the cache is valid and cannot be valid in another cache. Furthermore, the data has been modified as a result of a store operation.

When a cache miss occurs, if the requested data is found in both memory and another cache, supplying the data via a cache intervention is often preferred because cache-to-cache transfer latency is usually smaller than memory access latency. The IBM® Power 4 system, for example, enhances the MESI protocol to allow more cache interventions. An enhanced coherence protocol allows data of a shared cache line to be supplied to another cache via a cache intervention. In addition, if data of a modified cache line is supplied to another cache, the modified data is not necessarily written back to the memory immediately. A cache with the most up-to-date data can be held responsible for memory update when the data is eventually replaced.

For the purposes of the present disclosure, a cache that generates a cache request is referred to as the "requesting cache" of the cache request. A cache request can be sent to one or more caches and the memory. Given a cache request, a cache is referred to as a "sourcing cache" if the corresponding cache state shows that the cache can source the requested data to the requesting cache via a cache intervention. A cache is referred to as a "non-sourcing cache" if the corresponding cache state shows that the cache does not contain the requested data or cannot source the requested data to the requesting cache.

A major drawback of snoopy cache coherence protocols is that a cache request is usually broadcast to all caches in the system. This can cause serious problems to overall performance, system scalability and power consumption, especially for large SMP systems. Further, broadcasting cache requests indiscriminately may consume enormous network bandwidth, while snooping peer caches unnecessarily may require excessive cache snoop ports. It is worth noting that servicing a cache request may take more time than necessary when far away caches are snooped unnecessarily.

Directory-based cache coherence protocols have been proposed to overcome the scalability limitation of snoop-based cache coherence protocols. Typical directory-based protocols maintain directory information as a directory entry for each memory block to record the caches in which the memory block is currently cached. With a full-map directory structure, for example, each directory entry comprises one bit for each cache in the system, indicating whether the cache has a data copy of the memory block. A dirty bit can be used to indicate if the data has been modified in a cache without updating the memory to reflect the modified cache. Given a memory address, its directory entry is usually maintained in a node in which the corresponding physical memory resides. This node is often referred to as the "home" of the memory address. When a cache miss occurs, the requesting cache sends a cache request to the home, which generates appropriate point-to-point coherence messages according to the directory information.

However, directory-based coherence protocols have various shortcomings. First, maintaining a directory entry for each memory block usually results in significant storage overhead. Alternative directory structures such as a limited directory or a chained directory can reduce the storage overhead but with performance compromises. Second, accessing the directory can be time-consuming because directory information is usually stored in dynamic random access memories (DRAM's). Caching recently-used directory entries can potentially reduce directory access latencies but with increased implementation complexity. Third, accessing the directory causes three or four message passing hops to service a cache request, compared with two message passing hops with snoopy coherence protocols.

Consider a scenario in which a cache miss occurs in a requesting cache, while the requested data is modified in another cache. To service the cache miss, the requesting cache sends a cache request to the corresponding home. When the home receives the cache request, it forwards the cache request to the cache that contains the modified data. When the cache with the modified data receives the forwarded cache request, it sends the requested data to the requesting cache (an alternative is to send the requested data to the home, which will forward the requested data to the requesting cache).

Thus, it is generally desirable to have a scalable and efficient cache coherence protocol that combines the advantages of both snoop-based and directory-based cache coherence approaches without the disadvantages found individually in each approach.

SUMMARY OF THE INVENTION

In one aspect of the present invention, a system for ensuring scope-based cache coherence in a computer system is provided. The system includes a plurality of caches comprising a first cache and a second cache; a residence scope maintained for a memory address in the first cache, the residence scope representing a set of caches of the plurality of caches, the set of caches comprising at least zero caches; wherein if the second cache is included in the set of caches, the second cache potentially contains data of the memory address; and wherein if the second cache is excluded from the set of caches, the second cache does not contain the data of the memory address.

In another aspect of the present invention, a system for ensuring scope-based cache coherence in a computer system is provided. The system includes a plurality of caches comprising a first cache and a second cache; a residence scope maintained for a cache line in the first cache, the residence scope representing a set of caches of the plurality of caches, the set of caches comprising at least zero caches; wherein if the second cache is included in the set of caches, the second cache potentially contains data of the cache line; and wherein if the second cache is excluded from the set of caches, the second cache does not contain the data of the cache line.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
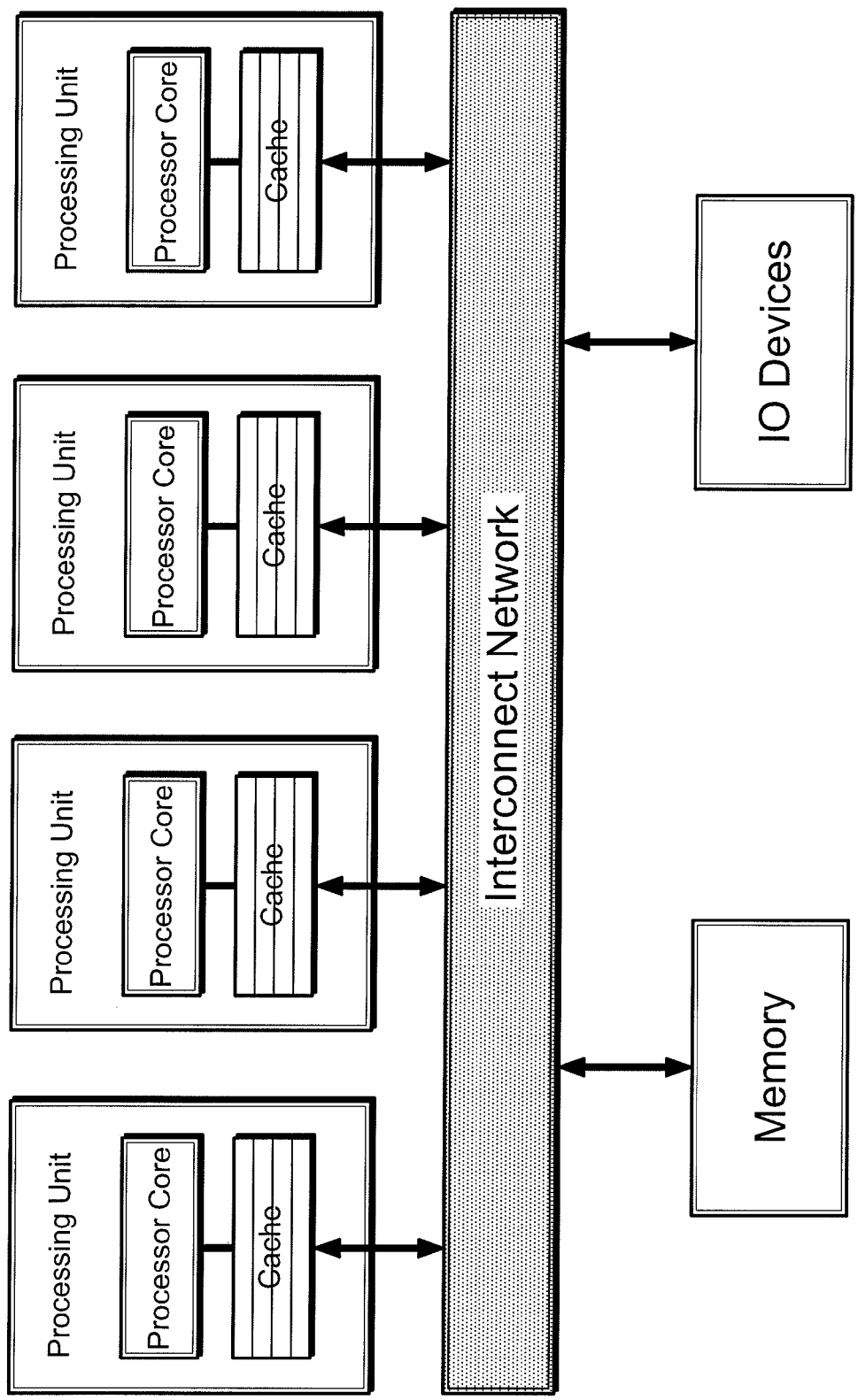
FIG. 1 depicts a typical SMP system that includes a number of processing units connected via an interconnect network, wherein each processing unit includes a processor core and a cache.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

An important observation of large SMP systems is that shared data generally has a small and stable sharing scope although different programs can have different data access patterns. That is, at any time, data of a memory address is usually shared by a small number of caches instead of all the caches. Furthermore, throughout a program execution, the caches in which the data of a memory address may need to be cached often remain quite stable. Therefore, if a cache maintains appropriate scope information, it can potentially avoid sending cache requests to caches outside the scope in case of a cache miss. This method of cache coherence is herein referred to as "scope-based cache coherence." Compared with broadcast-based snoopy cache coherence of the prior art, scope-based cache coherence can significantly improve the overall performance and scalability of SMP systems with reasonable implementation complexity and cost.

Scope information can be maintained for memory addresses. Scope information of a memory address specifies caches in which data of the address is potentially cached, but not necessarily caches in which data of the address is actually cached. Appropriate scope information can be used as snoop filters to reduce unnecessary cache snoops in SMP systems. At any time, data of a memory address may be cached in a cache inside the scope of the memory address, but cannot be cached in any cache outside the scope of the memory address.

Scope information of a memory address may need to be adjusted occasionally via an expand operation or a shrink operation. A scope can expand to include a cache that is currently outside the scope, if the cache needs to cache the data. Furthermore, a scope can shrink to exclude a cache that is currently inside the scope, if the cache no long needs to cache the data. Proper scope expand and shrink operations may be invoked as a result of sharing pattern change throughout the program execution.

Figure 2:
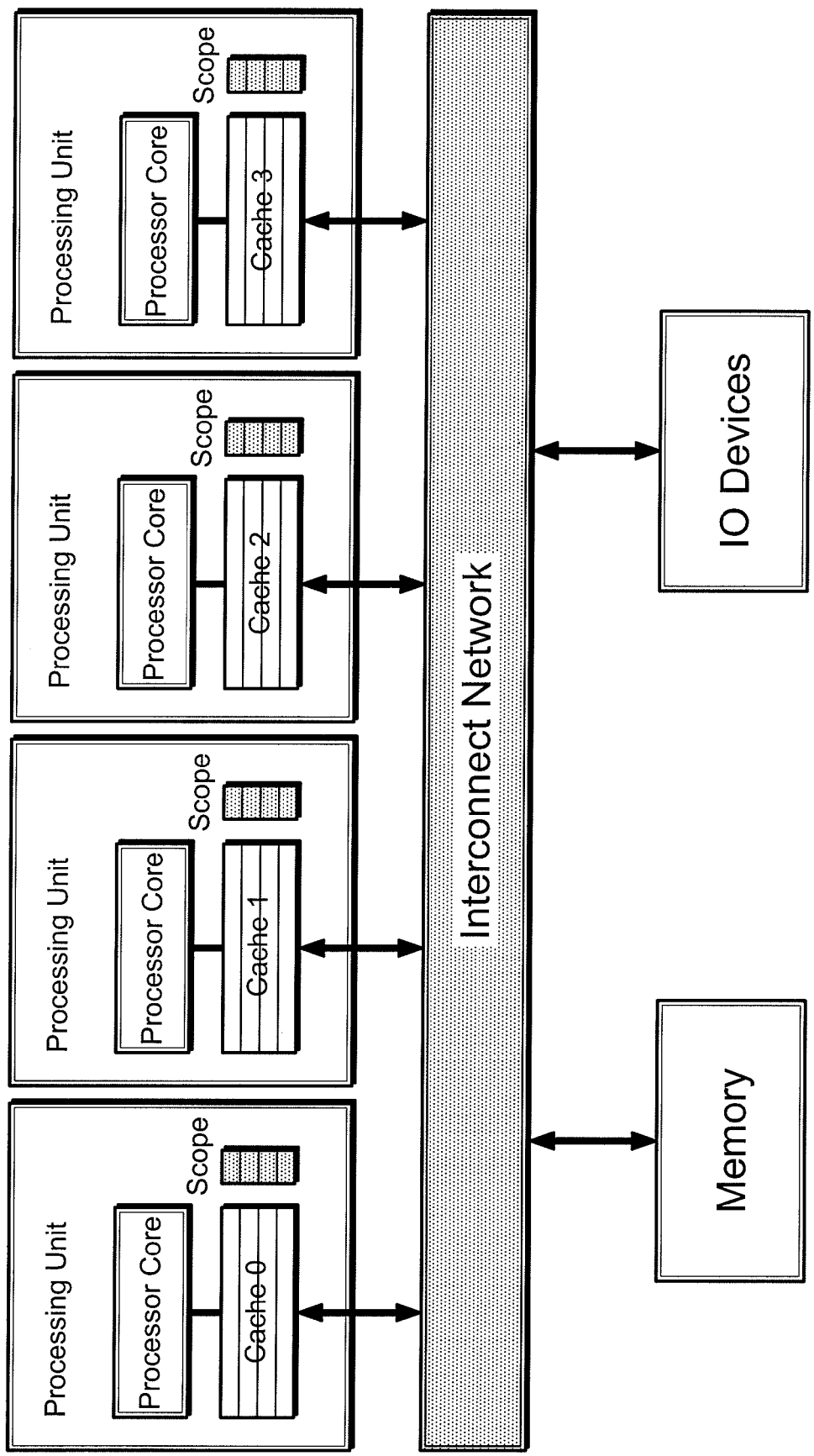
FIG. 2 depicts an exemplary SMP system with scope information maintained for each cache, wherein the scope information can be used by cache controllers (not shown) in handling cache misses, in accordance with one embodiment of the present invention.

Referring now to FIG. 2, in an exemplary illustrative embodiment of the present invention, each cache line maintains a residence scope that specifies the scope of caches in which the data can be cached. Given a cache line, at any time, its residence scope covers all caches in which the data is cached, although it may also cover caches in which the data is not cached. In a cache, the residence scope of a memory address is generally a superset of peer caches in which the data is cached, and therefore covers all caches that need to be snooped in a cache miss.

Residence scope information can be employed to improve overall performance of cache coherence protocols. With traditional snoop-based cache coherence, a coherence request is broadcast to all caches in the system. With scope-based cache coherence, in contrast, a coherence request needs to be sent to only those caches that are covered by the corresponding residence scope. For example, when a read miss occurs, the requesting cache sends a data request to caches specified in the corresponding residence scope, instead of broadcasting a data request to all the caches in the system. Similarly, when a write miss occurs on a shared cache line, the requesting cache sends an invalidate request to caches specified in the corresponding residence scope, instead of broadcasting an invalidate request to all the caches in the system. Scope-based cache coherence can reduce unnecessary cache snoop operations, and bandwidth consumption of coherence messages in SMP systems in which caches are interconnected via a network.

With scope-based cache coherence, a cache may maintain scope information for a memory address in an invalid cache state. As a result, the invalid (I) cache state can be further classified into two distinct states: invalid with scope information and invalid without scope information. When a cache line is invalidated, it can maintain its scope information for the corresponding memory address. This allows a cache request of a future cache miss on the memory address to be sent to caches covered in the residence scope, instead of all caches in the system. A cache line may lose its scope information for the memory address in a cache line replacement when the cache line is refilled with data of another memory address. When a cache miss occurs on an invalid cache line without scope information, the requesting cache generally needs to broadcast a cache request to all caches in the system due to the lack of scope information.

Scope information of a cache line can be maintained with various representations. For example, a cache line can maintain a scope vector that comprises a residence bit for each peer cache. The residence bit indicates whether the peer cache is covered in the residence scope. Alternatively, caches can be logically grouped into cache clusters or cache hierarchies (as opposed to a single peer cache) according to proximity or data access patterns to reduce the storage overhead of scope information. As a result, a cache line can maintain a scope vector that comprises a residence bit for each cache cluster, indicating whether caches in the cache cluster are covered in the residence scope. Likewise, a cache line can maintain a scope hierarchy number, indicating the cache hierarchy tree the residence scope covers. It should be appreciated that scope information of a cache line can often be encoded with the state of the cache line to further reduce the storage overhead.

Use of Scope Information in Cache Miss Handling

Figure 3:
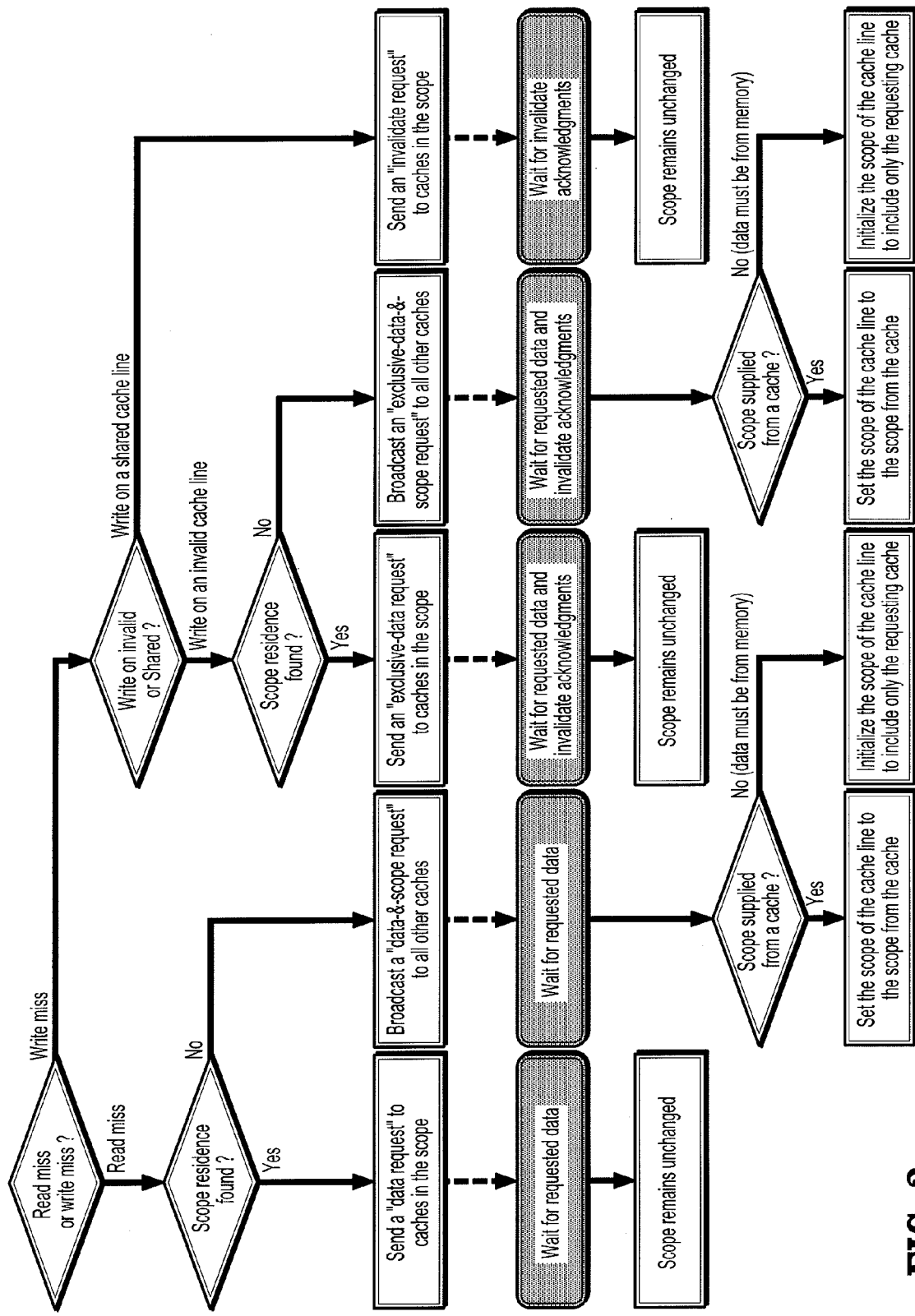
FIG. 3 depicts an exemplary flow diagram illustrating how scope information can be used to reduce cache coherence messages and cache snoop operations when a cache miss is serviced, in accordance with one embodiment of the present invention.

We now show how a cache miss can be serviced in an exemplary scope-based cache coherence protocol. Referring now to FIG. 3, an exemplary flow diagram is shown, illustrating how scope information can be used to reduce cache coherence messages and cache snoop operations when a cache miss occurs. A cache miss can be a read miss or a write miss. A read miss occurs when a shared data copy is requested on an invalid cache line. A write miss occurs when an exclusive data copy is requested on an invalid or shared cache line. Thus, there are five cache miss scenarios as follows.

A read miss on an invalid cache line with scope information;

A read miss on an invalid cache line without scope information;

A write miss on a shared cache line;

A write miss on an invalid cache line with scope information;

A write miss on an invalid cache line without scope information.

When a read miss occurs on an invalid cache line with scope information, the requesting cache sends a data request to caches that are included in the residence scope of the cache line. When a sourcing cache receives the data request, the sourcing cache sends the requested data to the requesting cache. The memory may need to supply the requested data if the requested data cannot be supplied from any cache. When the requesting cache receives the requested data, the requesting cache caches the requested data and the residence scope information remains unchanged.

Figure 4:
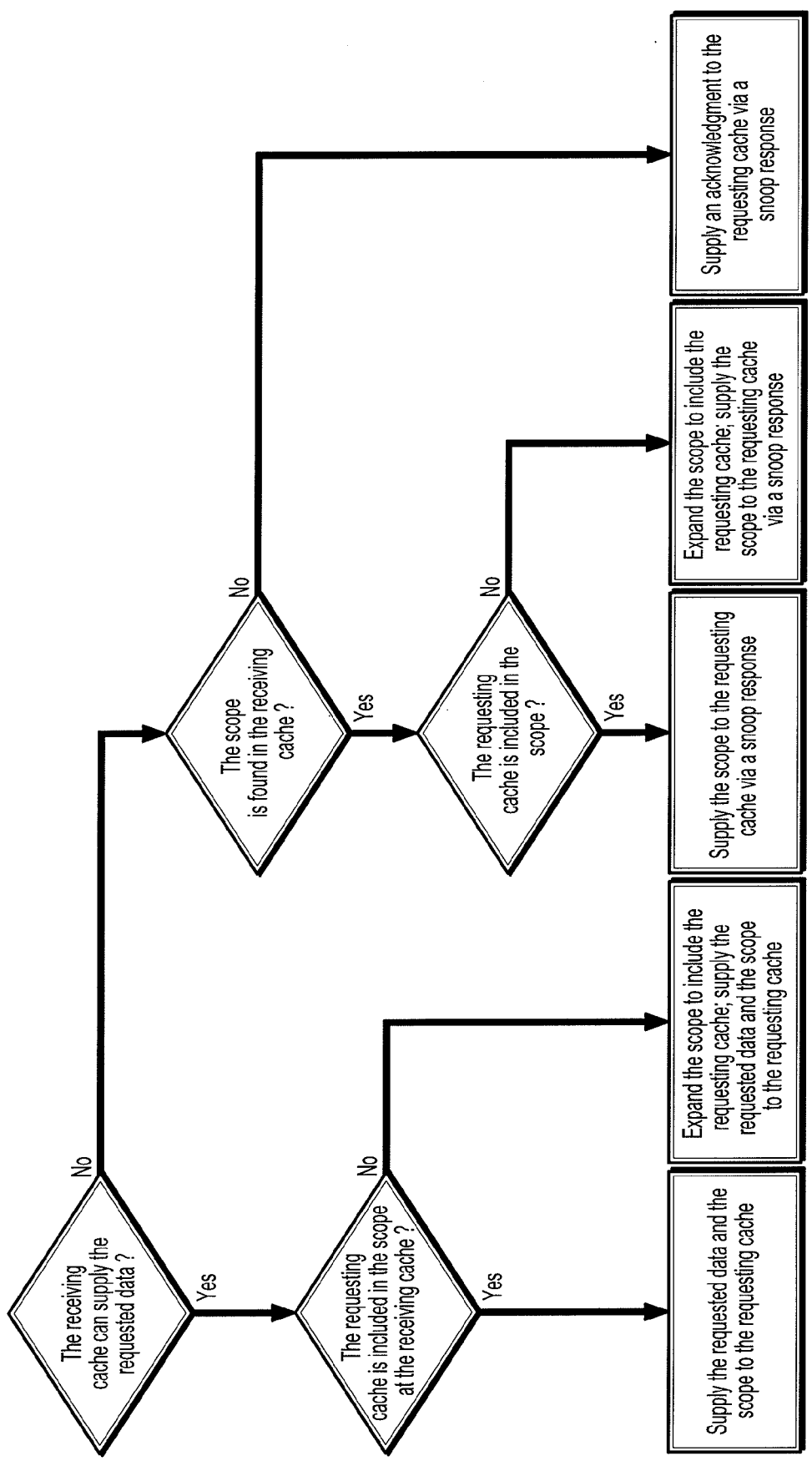
FIG. 4 depicts an exemplary flow diagram illustrating coherence operations when a cache receives a cache request for data of a memory address and its corresponding scope, in accordance with one embodiment of the present invention.

When a read miss occurs on an invalid cache line without scope information, the requesting cache broadcasts a data-and-scope request to all the caches in the system. On the other hand, when a cache receives the data-and-scope request, if the requesting cache is not included in the corresponding residence scope, the receiving cache needs to expand the residence scope to include the requesting cache. If the receiving cache is a sourcing cache, it sends the requested data and the scope information to the requesting cache. If the receiving cache is a non-sourcing cache, it simply sends an acknowledgment (via a snoop response) to the requesting cache. Furthermore, if the non-sourcing cache contains scope information for the snooped memory address, the scope information is included in the acknowledgment. As will be seen, the included scope information can be used to set the corresponding residence scope in the requesting cache if the requested data is supplied from the memory. Referring now to FIG. 4, an exemplary flow diagram is shown, illustrating coherence operations performed at the receiving cache when a data-and-scope request is received.

Back to the requesting cache side, when the requested data is received and cached, the requesting cache needs to specify the residence scope of the corresponding cache line accordingly. If the requested data is supplied from a sourcing cache, the residence scope of the cache line is set to the scope information associated with the requested data. If the requested data is supplied from the memory, one of at least two outcomes may occur, depending on whether scope information is included in snoop responses. If a snoop response from a non-sourcing cache includes scope information, the residence scope of the cache line is set to the scope information included in the snoop response. However, if no scope information is included in any snoop response, the requesting cache assigns the residence scope of the cache line with an appropriate initial residence scope. For example, an initial residence scope may include only the requesting cache, or a group of caches including the requesting cache (based on, for example, proximity or access patterns). Furthermore, software can be used to provide heuristic information that suggests particular caches to be included in the initial residence scope.

When a write miss occurs on a shared cache line, the requesting cache sends an invalidate request to caches that are included in the residence scope of the cache line. When a cache receives the invalidate request, the cache invalidates the data (if any) and sends an invalidate acknowledgment to the requesting cache. It should be appreciated that an invalidated cache line may choose to maintain its residence scope for future use. The requesting cache assumes the exclusive ownership of the data when all the invalidate requests are acknowledged.

When a write miss occurs on an invalid cache line with scope information, the requesting cache sends an exclusive-data request to caches that are included in the residence scope of the cache line. When a sourcing cache receives the exclusive-data request, the sourcing cache invalidates the requested data and sends the requested data to the requesting cache. When a non-sourcing cache receives the exclusive-data request, the non-sourcing cache invalidates the data (if any) and sends an invalidate acknowledgment to the requesting cache. It should be appreciated that when a cache line is invalidated, it may choose to maintain its residence scope for future use. When the requesting cache receives the requested data and all the invalidate acknowledgments, it caches the requested data in an exclusive state and the residence scope information remains unchanged.

Figure 5:
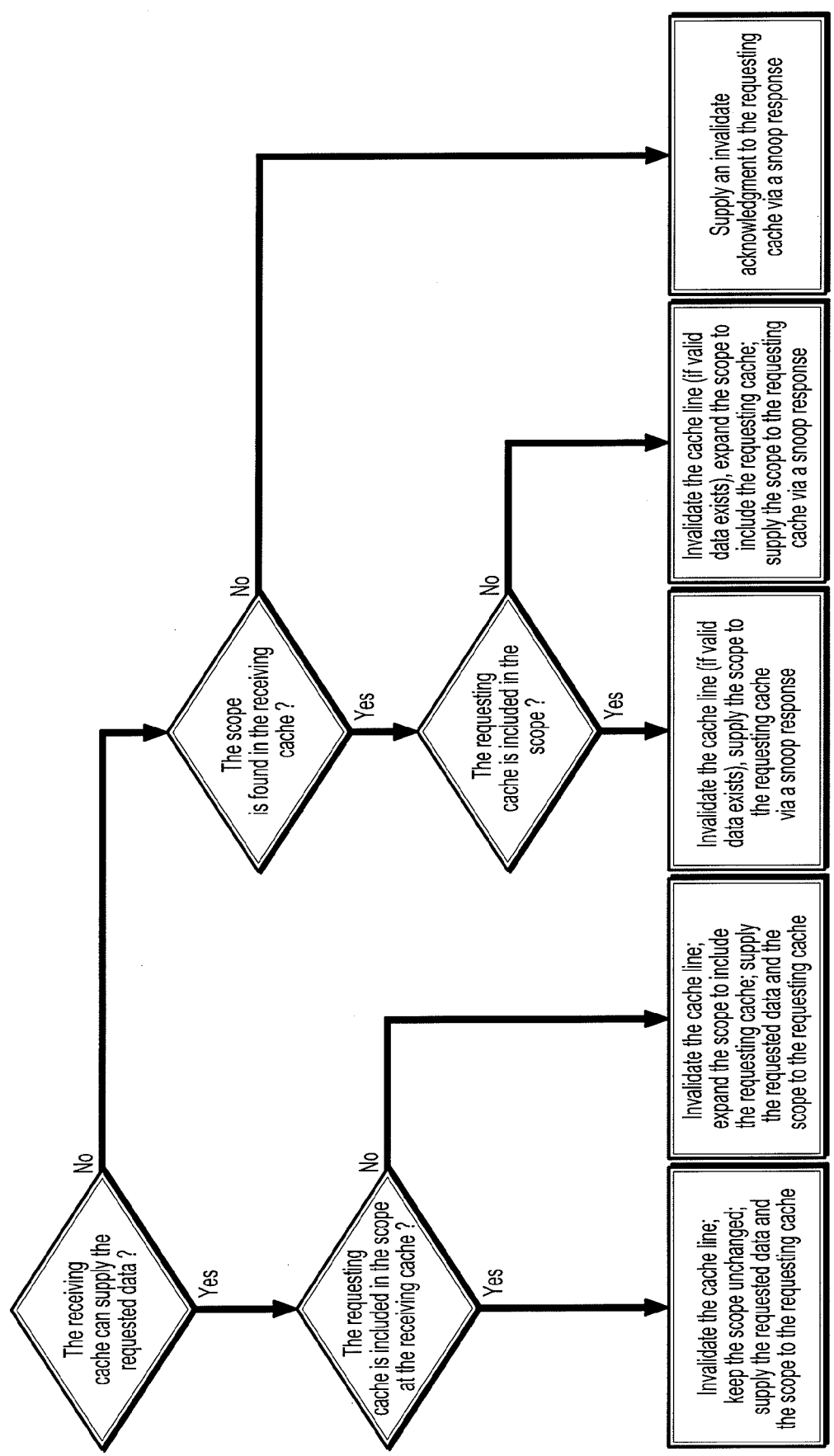
FIG. 5 depicts an exemplary flow diagram illustrating coherence operations when a cache receives a cache request for exclusive data of a memory address and its corresponding scope, in accordance with one embodiment of the present invention.

When a write miss occurs on an invalid cache line without scope information, the requesting cache broadcasts an exclusive-data-and-scope request to all the caches in the system. On the other hand, when a cache receives the exclusive-data-and-scope request, if the requesting cache is not included in the corresponding residence scope, the receiving cache needs to expand the corresponding residence scope to include the requesting cache. If the receiving cache is a sourcing cache, it invalidates the requested data and sends the requested data and the scope information to the requesting cache. If the receiving cache is a non-sourcing cache, it invalidates the data (if any) and sends an invalidate acknowledgment to the requesting cache. Furthermore, if the non-sourcing cache contains scope information for the invalidated memory address, the scope information is included in the invalidate acknowledgment. As described below, the scope information included in the invalidate response can be used to set the corresponding residence scope in the requesting cache if the requested data is supplied from the memory. It should be appreciated that when a cache line is invalidated, it may choose to maintain its residence scope for future use. Referring now to FIG. 5, an exemplary flow diagram is shown, illustrating coherence operations performed at the receiving cache when an exclusive-data-and-scope request is received.

Back to the requesting cache side, when the requesting cache receives the requested data and all the invalidate acknowledgments, the requesting cache caches the requested data in an exclusive state and sets the residence scope of the corresponding cache line properly. If scope information is associated with the requested data or included in at least one invalidate acknowledgment, the scope information is used to set the residence scope of the cache line. Otherwise the requesting cache assigns the residence scope of the cache line with an appropriate initial residence scope. An exemplary initial residence scope includes just the requesting cache itself.

Scope Calibration

We now discuss issues related to scope calibration that aims at reconstructing a residence scope to reflect changing data access patterns throughout program execution. With scope-based cache coherence, since data of a memory address is first cached, the residence scope gradually expands to include those caches in which the data needs to be cached. This scope expansion process is referred to as the scope warm-up period. After the scope warm-up period, the residence scope may occasionally need to be expanded to include a cache that currently is not covered in the scope. If a cache loses the residence scope as a result of a cache line replacement, the cache may retrieve the corresponding scope information from another cache in the future. However, if the scope information is removed from all the caches in the system, the scope warm-up period is repeated to construct the residence scope when the data is cached again.

Although scope information generally remains stable, it may need to be adjusted occasionally throughout the program execution. When a cache is included in a residence scope, the cache usually remains in the residence scope until a scope calibration is performed. Software can be used to provide commands or hints to invoke scope calibrations at appropriate times. For example, when a process is migrated or terminated, the operating system can notify the underlying coherence mechanism that the corresponding residence scope may need to be calibrated. Alternatively, scope calibrations can be invoked by hardware to ensure that scope information reflects changing program behaviors. It should be appreciated that whether and when a scope calibration should be invoked cannot compromise the cache coherence correctness, although it may affect the cache coherence performance.

To determine when a scope calibration is needed, each cache can maintain a calibration predictor that predicts when a scope calibration should be invoked as data access patterns evolve. An exemplary calibration predictor includes a calibration counter for each cache line that represents the necessity of invoking a scope calibration. When a cache first sets the scope residence of a cache line, the associated calibration counter is set to an initial value 0 (or the calibration counter of another cache from which the scope residence is retrieved). The calibration counter is then incremented properly if invalidate acknowledgments of a write miss indicate that the residence scope contains a cache in which no valid data exists to be invalidated. An invalidate acknowledgment distinguishes between the case in which a valid copy is invalidated and the case in which no valid copy exists to be invalidated. If the calibration counter reaches some pre-defined threshold, the calibration predictor predicts that a scope calibration needs to be invoked on the cache line.

When a calibration counter is updated, an appropriate update policy is critical to the effectiveness of the calibration predictor. The calibration counter can simply be incremented by 1 if the scope includes one or more caches in which no valid data exists to be invalidated. Alternatively, the calibration counter can be incremented according to the cost of unnecessary invalidate operations due to imprecise scope information. For example, the calibration counter can be incremented by 1 for each cache in the scope that contains no valid copy to be invalidated. Furthermore, the calibration counter can be incremented by a number greater than 1 if the scope includes a cache that contains no valid copy and is far away from the requesting cache.

When the calibration predictor determines that a scope calibration is needed, the cache can send a calibration request to all other caches covered in the current residence scope. When a cache receives the calibration request, the cache removes the scope information from the cache (e.g., by setting the cache state to I-NoScope) and sends an acknowledgment to the requesting cache. When the requesting cache receives all the acknowledgments, the requesting cache completes the scope calibration by setting its residence scope to an appropriate initial residence scope such as a scope that only includes the requesting cache itself. The calibration counter is set to 0.

It should be appreciated that, when a scope calibration is needed, the cache can postpone the scope calibration until the cache multicasts a coherence message to all other caches covered in the current residence scope. This allows the calibration request to be piggybacked to another coherence message. For example, a cache can choose to invoke a scope calibration when the cache needs to invalidate shared copies in all other caches in the scope. When a cache write miss occurs on a shared cache line, the requesting cache can send an invalidate-and-calibration request to caches that are included in the residence scope of the cache line. When a cache receives the invalidate-and-calibration request, the cache invalidates the data, removes the scope information, and sends an acknowledgment to the requesting cache. When the requesting cache receives all the acknowledgments, it assumes the exclusive ownership, sets the calibration counter to 0, and sets the residence scope to include only the requesting cache itself.

An Example of Scope-Based Cache Coherence

We now show how scope information can be used in an exemplary snoopy cache coherence protocol. The exemplary coherence protocol is an enhancement of the MESI protocol with cache intervention capability of shared data. In addition to the modified (M), exclusive (E), shared (S) and invalid (I) states, the exemplary protocol includes a shared-source (S-Source) state, indicating that the cache contains a shared copy that can be sourced to another cache via a cache intervention if requested. Furthermore, the invalid (I) state is split into two states, invalid with scope information (I-Scope) and invalid without scope information (I-NoScope). Although the exemplary protocol is described herein for the sake of simplicity, it should be understood that the scope-based cache coherence technique can be applied to other coherence protocols, as contemplated by those skilled in the art.

Consider an SMP system that comprises four caches labeled from cache 0 to cache 3 (see, for example, FIG. 2). Each cache line maintains a scope vector that comprises a residence bit for each cache in the system. In our notation, residence bits of a scope vector are recorded in sequential order, wherein the right-most-bit corresponds to cache 0, and the left-most-bit corresponds to cache 3. Assume initially that no cache contains data or scope information of a given memory address. Consider the following exemplary sequence of cache operations on the address.

1. A read cache miss occurs in cache 0. Due to the lack of scope information, cache 0 broadcasts a data-and-scope request to all other caches in the system. When cache 0 receives the requested data from the memory, cache 0 sets the residence scope of the cache line to 0001, indicating that the residence scope covers only cache 0. The cache state indicates that the data is exclusively cached in cache 0.
2. A read cache miss occurs in cache 1. Due to the lack of scope information, cache 1 broadcasts a data-and-scope request to all other caches in the system. When cache 0 receives the data-and-scope request, cache 0 updates its residence scope to 0011, indicating that the residence scope includes caches 0 and 1. Meanwhile, cache 0 sends the requested data and the residence scope to cache 1. Cache 1 becomes the sourcing cache of the shared data.
3. A read cache miss occurs in cache 3. Due to the lack of scope information, cache 3 broadcasts a data-and-scope request to all other caches in the system. When cache 0 receives the data-and-scope request, cache 0 updates its residence scope to 1011, indicating that the residence scope includes caches 0, 1 and 3. When cache 1 receives the data-and-scope request, cache 1 updates its residence scope to 1011, and sends the requested data and the residence scope to cache 3. Cache 3 becomes the sourcing cache of the shared data.
4. A write cache miss occurs on the shared cache line in cache 0. According to its scope information, cache 0 sends an invalidate request to caches 1 and 3. When cache 0 receives invalidate acknowledgments from caches 1 and 3, cache 0 claims the exclusive ownership of the cache line. It is worth noting that the corresponding scope information remains in caches 1 and 3 even though the corresponding cache line has been invalidated. It should be appreciated that cache 2 is not involved in the invalidate operation because of the scope information maintained in cache 0.
5. Cache 0 modifies the data and sets the cache state accordingly.
6. A read cache miss occurs in cache 1. According to its scope information, cache 0 sends a data request to caches 0 and 3. When cache 0 receives the data request, cache 0 supplies the requested data while updating the memory with the most up-to-date data. (It should be appreciated that a more sophisticated coherence protocol may choose not to update the memory immediately, provided that a cache with the most up-to-date data is held responsible for memory update when necessary). Cache 1 becomes the sourcing cache of shared data.
7. Cache 0 replaces the data and removes the residence scope of the memory address.
8. Cache 1 replaces the data and removes the residence scope of the memory address.
9. A read cache miss occurs in cache 0. Due to the lack of scope information, cache 0 broadcasts a data-and-scope request to all other caches. When cache 3 receives the data-and-scope request, cache 3 supplies the scope information in its snoop response. The requested data is supplied from the memory.
10. A read cache miss occurs in cache 3. According to its scope information, cache 3 sends a data request to caches 0 and 1. The requested data is supplied from cache 0. It should be appreciated that cache 2 is not involved. Cache 3 becomes the sourcing cache of the shared data.
11. A write cache miss occurs in cache 2. We assume that a scope calibration is invoked. Cache 2 broadcasts an exclusive-data-and-calibration request to all other caches in the system. When cache 3 receives the exclusive-data-and calibration request, cache 3 invalidates the data, removes the scope information, and sends the requested data to cache 2. When cache 0 or cache 1 receives the exclusive-data-and-calibration request, the cache (i.e., cache 0 or cache 1) invalidates the data (if any), removes the scope information (if any), and sends an acknowledgment to cache 2. When cache 2 receives the requested data and the acknowledgments indicating that the scope information is removed from all other caches, cache 2 caches the requested data and sets the residence scope of the cache line to 0100, indicating that the calibrated residence scope includes only cache 2.

The table below summarizes the cache operations and corresponding cache state and residence scope updates, as described above.

|  | Cache 0 | Cache 1 | Cache 2 | Cache 3 |
|---|---|---|---|---|
| (0) Initially no cache contains the data or residence scope | I-NoScope | I-NoScope | I-NoScope | I-NoScope |
| (1) Cache 0 sends a data-and-scope request to all other caches, and receives the requested data from memory | E 0001 | I-NoScope | I-NoScope | I-NoScope |
| (2) Cache 1 sends a data-and-scope request to all other caches, and receives the requested data from cache 0 | S 0011 | S-Source 0011 | I-NoScope | I-NoScope |
| (3) Cache 3 sends a data-and-scope request to all other caches, and receives the requested data from cache 1 | S 1011 | S 1011 | I-NoScope | S-Source 1011 |
| (4) Cache 0 sends an invalidate request to caches 1 and 2, and receives the invalidate acknowledgments | E 1011 | I-Scope 1011 | I-NoScope | I-Scope 1011 |
| (5) Cache 0 modifies the data | M 1011 | I-Scope 1011 | I-NoScope | I-Scope 1011 |
| (6) Cache 1 sends a data request to caches 0 and 3, and receives the requested data from cache 0 | S 1011 | S-Source 1011 | I-NoScope | I-Scope 1011 |
| (7) Cache 0 replaces the data and loses its residence scope | I-NoScope | S-Scope 1011 | I-NoScope | I-Scope 1011 |
| (8) Cache 1 replaces the data and loses its residence scope | I-NoScope | I-NoScope | I-NoScope | I-Scope 1011 |
| (9) Cache 0 sends a data-scope request to all other caches, and receives the requested data from memory | E 1011 | I-NoScope | I-NoScope | I-Scope 1011 |
| (10) Cache 3 sends a data request to caches 0 and 1, and receives the requested data from cache 0 | S 1011 | I-NoScope | I-NoScope | S-Source 1011 |
| (11) Cache 2 sends an exclusive-data-and-calibration request to all other caches, and receives the data from cache 3 | I-NoScope | I-NoScope | E 0100 | I-NoScope |

Some Further Discussion

Scope-based cache coherence allows an invalid cache line to maintain its scope information, which is updated whenever the scope needs to be expanded. When a cache miss occurs on the invalidated cache line, the cache sends a cache request to the peer caches that are included in the scope, instead of broadcasting a cache request to all the peer caches in the system. This can be particularly useful for reducing coherence overhead due to producer-consumer access patterns.

Another characteristic of scope-based cache coherence is that, when a cache line is invalidated or replaced from a cache, the cache can still remain in the corresponding residence scope that is maintained in other caches. In other words, once a cache is included in a residence scope, the cache can remain in the residence scope until a scope calibration is invoked, or the corresponding residence scope is removed from all the caches in the system because of cache line replacements. This property distinguishes scope-based coherence protocols from coherence protocols that maintain directory like information at caches. As a result, a cache within the corresponding residence scope can receive data without updating scope information in other caches.

Consider an SMP system that comprises multiple partitions running independent tasks. With broadcast-based snoopy cache coherence, a cache broadcasts a cache request to all other caches in the system when a cache miss occurs. With scope-based cache coherence, each cache can maintain scope information indicating the partitions in which data of a memory address can be cached. As a result, in case of a cache miss, a cache needs to send a cache request only to the caches in the corresponding partition. This optimization is particularly useful when a large SMP system is partitioned into multiple small SMP systems running separate operating systems.

It should be appreciated that a cache can employ a dedicated residence scope buffer to record scope information of recently replaced cache lines. When a cache miss occurs on a replaced cache line, the cache can avoid a request broadcast if the corresponding scope information can be found in the residence scope buffer.

It should further be appreciated that scope information can be maintained for memory regions instead of cache lines. For programs with spatial locality, maintaining scope information for memory regions can reduce the storage overhead and the scope warm-up time. For example, a scope-based cache coherence protocol can choose to maintain scope information based on 4 KB memory pages.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for ensuring scope-based cache coherence in a computer system, comprising:
   a plurality of caches comprising a first cache and a second cache;
   a residence scope maintained for a memory address in the first cache, the residence scope representing a set of caches of the plurality of caches;

wherein if the second cache is included in the set of caches, the second cache potentially contains data of the memory address;

wherein if the second cache is excluded from the set of caches, the second cache does not contain the data of the memory address;

wherein the first cache performs a scope calibration, the scope calibration calibrating the residence scope of the memory address; and wherein the first cache sends a scope calibration request to only the set of caches represented by the residence scope.

2. The system of claim 1, wherein when a cache miss occurs on the memory address in the first cache, the first cache sends a cache request to the second cache, if the second cache is included in the set of caches.

3. The system of claim 1, wherein if the data of the memory address in the first cache is invalidated, the residence scope maintained for the memory address in the first cache remains unchanged.

4. The system of claim 1, wherein if the data of the memory address in the second cache is invalidated, the residence scope maintained for the memory address in the first cache remains unchanged.

5. The system of claim 1, wherein the first cache performs a scope expand operation, the scope expand operation adding the second cache into the set of caches represented by the residence scope.

6. The system of claim 5, wherein the scope expand operation is performed, if the second cache receives the data of the memory address and caches the data, and if the second cache is excluded from the set of caches represented by the residence scope.

7. The system of claim 1, wherein the first cache performs a scope shrink operation, the scope shrink operation removing the second cache from the set of caches represented by the residence scope.

8. The system of claim 7, wherein the scope shrink operation is performed if the data of the memory address in the second cache is replaced.

9. The system of claim 1, wherein the first cache supplies the residence scope of the memory address to the second cache.

10. The system of claim 9, wherein the second cache uses the residence scope as an initial residence scope of the memory address.

11. The system of claim 1, wherein the scope calibration is performed, if the first cache receives a hint from software indicating that a scope calibration is needed for the memory address.

12. The system of claim 1, further comprising a scope calibration prediction mechanism at the first cache, the scope calibration prediction mechanism predicting if a scope calibration is needed for the memory address.

13. The system of claim 12, wherein the scope calibration is performed, if the scope calibration prediction mechanism predicts that a scope calibration is needed for the memory address.

14. The system of claim 13, wherein the scope calibration prediction mechanism comprises a calibration counter, the scope calibration prediction mechanism predicting that a scope calibration is needed for the memory address if the calibration counter reaches a calibration threshold.

15. The system of claim 14, wherein the calibration counter is updated when the scope residence services a read cache miss on the memory address in the first cache.

16. The system of claim 14, wherein the calibration counter is updated when the scope residence services a write cache miss on the memory address in the first cache, wherein the write cache miss is one of a write on invalid cache line and a write on shared cache line.

17. The system of claim 14, wherein the calibration counter is updated when the first cache detects that the data of the memory address is not cached in at least one cache in the set of caches.

18. The system of claim 1, wherein if the second cache receives the scope calibration request, the second cache records that no residence scope is maintained for the memory address in the second cache.

19. The system of claim 1, wherein the scope calibration request is generated when a write cache miss occurs on the memory address in the first cache.

20. The system of claim 1, wherein the scope calibration request is piggybacked with another message sent by the first cache.

21. The system of claim 1,
wherein the residence scope comprises a residence scope bit for the second cache, the residence scope bit indicating one of a first state and a second state;
wherein if the residence scope bit indicates the first state, the second cache is included in the set of caches represented by the residence scope; and
wherein if the residence scope bit indicates the second state, the second cache is excluded from the set of caches represented by the residence scope.

22. The system of claim 1,
wherein the residence scope comprises a residence scope bit for at least one cache of the plurality of caches, the residence scope bit indicating one of a first state and a second state;
wherein if the residence scope bit indicates a first state, the at least one cache are included in the set of caches represented by the residence scope; and
wherein if the residence scope bit indicates a second state, the at least one cache are excluded from the set of caches represented by the residence scope.

23. The system of claim 1, wherein the residence scope can be encoded into a cache state maintained for a cache line in the first cache containing the memory address.

24. A system for ensuring scope-based cache coherence in a computer system, comprising:
a plurality of caches comprising a first cache and a second cache;
a residence scope maintained for a cache line in the first cache, the residence scope representing a set of caches of the plurality of caches;
wherein if the second cache is included in the set of caches, the second cache potentially contains data of the cache line;
wherein if the second cache is excluded from the set of caches, the second cache does not contain the data of the cache line;
wherein the first cache performs a scope calibration, the scope calibration calibrating the residence scope of the cache line; and
wherein the first cache sends a scope calibration request to only the set of caches represented by the residence scope.

25. The system of claim 24, wherein when a cache miss occurs at the cache line in the first cache, the first cache sends a cache request to the second cache, if the second cache is included in the set of caches.

26. The system of claim 24, wherein if the data of the cache line in the first cache is invalidated, the residence scope maintained for the cache line in the first cache remains unchanged.

27. The system of claim 24, wherein if the data of the cache line in the second cache is invalidated, the residence scope maintained for the cache line in the first cache remains unchanged.

28. The system of claim 24, wherein the first cache performs a scope expand operation, the scope expand operation adding the second cache into the set of caches represented by the residence scope.

29. The system of claim 28, wherein the scope expand operation is performed, if the second cache receives the data of the cache line and caches the data, and if the second cache is excluded from the set of caches represented by the residence scope.

30. The system of claim 24, wherein the first cache performs a scope shrink operation, the scope shrink operation removing the second cache from the set of caches represented by the residence scope.

31. The system of claim 30, wherein the scope shrink operation is performed if the data of the cache line contained in the second cache is replaced.

32. The system of claim 24, wherein the first cache supplies the residence scope of the cache line to the second cache.

33. The system of claim 32, wherein the second cache uses the residence scope as an initial residence scope when a requested cache line is allocated in the second cache to contain the data of the cache line.

34. The system of claim 24, wherein the scope calibration is performed, if the first cache receives a hint from software indicating that a scope calibration is needed for the cache line.

35. The system of claim 24, further comprising a scope calibration prediction mechanism at the first cache, the scope calibration prediction mechanism predicting if a scope calibration is needed for the cache line.

36. The system of claim 35, wherein the scope calibration is performed, if the scope calibration prediction mechanism predicts that a scope calibration is needed for the cache line.

37. The system of claim 36, wherein the scope calibration prediction mechanism comprises a calibration counter, the scope calibration prediction mechanism predicting that a scope calibration is needed for the cache line if the calibration counter reaches a calibration threshold.

38. The system of claim 37, wherein the calibration counter is updated when the scope residence services a read cache miss at the cache line in the first cache.

39. The system of claim 37, wherein the calibration counter is updated when the scope residence services a write cache miss at the cache line in the first cache, wherein the write cache miss is one of a write on invalid cache line and a write on shared cache line.

40. The system of claim 37, wherein the calibration counter is updated when the first cache detects that the data of the cache line is not cached in at least one cache in the set of caches.

41. The system of claim 24, wherein if the second cache receives the scope calibration request, and if the second cache contains a calibrating cache line with an identical address to the cache line in the first cache, the second cache records that no residence scope is maintained for the calibrating cache line in the second cache.

42. The system of claim 24, wherein the scope calibration request is generated when a write cache miss occurs at the cache line in the first cache.

43. The system of claim 24, wherein the scope calibration request is piggybacked with another message sent by the first cache.

44. The system of claim 24,
wherein the residence scope comprises a residence scope bit for the second cache, the residence scope bit indicating one of a first state and a second state;
wherein if the residence scope bit indicates the first state, the second cache is included in the set of caches represented by the residence scope; and
wherein if the residence scope bit indicates the second state, the second cache is excluded from the set of caches represented by the residence scope.

45. The system of claim 24,
wherein the residence scope comprises a residence scope bit for at least one cache of the plurality of caches, the residence scope bit indicating one of a first state and a second state;
wherein if the residence scope bit indicates a first state, the at least one cache are included in the set of caches represented by the residence scope; and
wherein if the residence scope bit indicates a second state, the at least one cache are excluded from the set of caches represented by the residence scope.

46. The system of claim 24, wherein the residence scope can be encoded into a cache state maintained for the cache line.

47. The system of claim 24, further comprising a residence scope buffer maintained in the first cache, the scope buffer recording the residence scope of a replaced cache line, previously the cache line in the first cache, wherein the first cache checks the residence scope buffer upon a cache miss on the replaced cache line.

* * * * *